United States Patent
McMullen, Jr.

(10) Patent No.: US 6,224,151 B1
(45) Date of Patent: May 1, 2001

(54) FUNCTIONALLY ERGONOMIC BICYCLE SADDLE

(76) Inventor: Allan McMullen, Jr., 16 Garbosa Rd., Santa Fe, NM (US) 87505

( * ) Notice: Subject to any disclaimer, the term of this patent is extended or adjusted under 35 U.S.C. 154(b) by 0 days.

(21) Appl. No.: 09/557,332

(22) Filed: Apr. 24, 2000

(51) Int. Cl.[7] ........................................................ B62J 1/00
(52) U.S. Cl. ........................................ 297/202; 297/178.1
(58) Field of Search ............................... 297/195.1, 202, 297/215.16

(56) References Cited

U.S. PATENT DOCUMENTS

| 605,673 | * | 6/1898 | Hunt | 297/202 |
| 5,921,624 | * | 7/1999 | Wu | 297/195.1 X |
| 6,030,035 | * | 2/2000 | Yates | 297/195.1 X |
| 6,139,098 | * | 10/2000 | Carrillo | 297/195.1 X |

FOREIGN PATENT DOCUMENTS

246910 * 4/1926 (IT) ................................... 297/195.1

* cited by examiner

Primary Examiner—Peter R. Brown

(74) Attorney, Agent, or Firm—Daniel Robbins

(57) ABSTRACT

A bicycle saddle in which the rear one third of the saddle is an elevated level platform supports the cyclist's weight on the ischial tuberosities, while forward of the platform the saddle's surface steps down and then continuously slopes downward towards the saddle's nose. Thus the only points of the rider's anatomy in weight bearing contact with the saddle are the ischial tuberosities, as the rider's soft perineal tissue is positioned above the stepped down and downward sloping portion of the saddle. Additionally, to guard against soft tissue contact with the saddle for some riders having a lowered or forward cycling position, a groove runs from the middle of the level platform along the saddle surface to the saddle's nose. The shell of the saddle is supported by an armature rail fabricated from rigid rod, which connects the saddle to the bicycle frame. The rear of the armature is mated to the shell by means of a bridge element transversely secured to the bottom of the saddle's shell. The bridge is located at the forward edge of the elevated platform allowing the rear of the saddle to flex downwards, and resulting in better absorption of vibration and impact shock transferred up through the bicycle frame. Additionally, patterns of perforations are cut through the plastic saddle shell under the preferred location for the ischial tuberosities which center the rider in position on the platform, and allow the ischial bones greater freedom of movement as the rider pedals.

8 Claims, 2 Drawing Sheets

FUNCTIONALLY ERGONOMIC BICYCLE SADDLE

BACKGROUND OF THE INVENTION

1. Field of the Invention

This invention relates to a bicycle saddle, and in particular to a bicycle saddle providing increased rider comfort and bodily protection.

2. Description Relative to the Prior Art

The search for a satisfactory bicycle saddle is motivated by the prevalence of seat related pelvic and perineal distress or injury suffered by both male and female cyclists. A thorough discussion of these physical problems and their relation to bicycle saddle characteristics may be found in U.S. Pat. No. 5,988,739 issued to Dodge et al. To attack these problems, the search for an improved seat extends back at least into the latter part of the 1800's, and the prior art developed over this time period discloses an abundance of saddle designs, geometries and materials aimed at alleviating the cyclist's seat induced difficulties.

One saddle feature disclosed in the prior art is the mid-section being the lowest point between the rear and nose of the saddle. Such a hammock like configuration encourages the rider to slide forward settling in the low midsection, which in turn brings soft tissue areas in greater contact with this narrow area of the saddle on which most of the rider's weight is now concentrated. If the rail mounts are at the extreme ends of the saddle, all downward flexing occurs at the midsection increasing the hammock effect. The midsection may be softened with gel pads, and cut-outs made in the base of the saddle to alleviate soft tissue compression, but nothing is as soft as soft tissues, and such structural features do not adequately provide solutions to the problems.

Today cycling as a recreational and as a competitive sport has grown both in popularity and in sophistication. Today's bicycles incorporate high tech mechanical elements, and are constructed of sturdy, light weight space age materials. These bicycles provide the opportunity for long distance touring and long distance racing over routes that vary in terrain and in the physical demands made on the cyclist. However, the discomfort of presently available saddles continues to limit total enjoyment of the sport. The present invention discloses a bicycle saddle adapted for improved cyclist comfort and safety for multiple modes of cycling usage.

SUMMARY OF THE INVENTION

In the saddle of the present invention, the rear one third of the saddle is an elevated level platform that supports the cyclist's weight on the ischial tuberosities, while forward of the platform the saddle's surface steps down and then continuously slopes downward towards the saddle's nose. Thus the only points of the rider's anatomy in weight bearing contact with the saddle are the ischial tuberosities, as the rider's soft perineal tissue is positioned above the stepped down and downward sloping portion of the saddle. Additionally, to guard against soft tissue contact with the saddle for some riders having a lowered or forward cycling position, a groove runs from the middle of the level platform along the saddle surface to the saddle's nose. The shell of the saddle is supported by an armature rail fabricated from rigid rod, which connects the saddle to the bicycle frame. The rear of the armature is mated to the shell by means of a bridge element transversely secured to the bottom of the saddle's shell. The bridge is located at the forward edge of the elevated platform allowing the rear of the saddle to flex downwards, and resulting in better absorption of vibration and impact shock transferred up through the bicycle frame. Additionally, patterns of perforations are cut through the plastic saddle shell under the preferred location for the ischial tuberosities which center the rider in position on the platform, and allow the ischial bones greater freedom of movement as the rider pedals.

The structure of the saddle of the invention provides comfortable support while cycling up hill, down hill, as well as over level terrain. Accordingly, the rear and nose of the saddle have been ramped downward to better facilitate the transition to forward and back riding positions during sprints, ascents and descents.

BRIEF DESCRIPTION OF THE DRAWINGS

The invention will be described with respect to the drawings of which.

DESCRIPTION OF THE PREFERRED EMBODIMENTS

Figure 1:
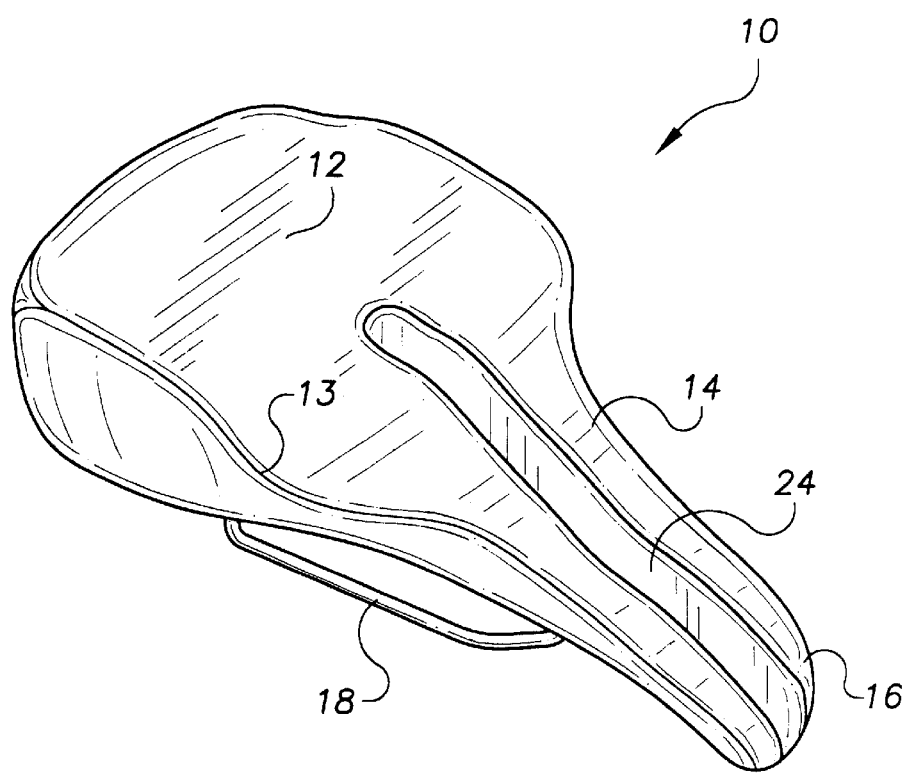
FIG. 1 is a perspective drawing of the saddle of the invention.

The saddle of the invention utilizes a plastic shell base covered by a layer of soft foam material with a leather like material as the finished surface over the foam layer. Referring to FIG. 1, a saddle 10 has a level platform 12 extending approximately over the rear third of the longitudinal length of the saddle 10. At the leading edge of the level platform 12, the saddle has a step 13 that drops down to the mid-section 14 which then slopes smoothly further downward towards the nose 16 at the end of the saddle 10. The nose portion 16 further slopes down from the mid-section 14, providing soft tissue clearance in combination with the groove 24 for a cyclist moving forward on the saddle 10 during an ascent. Rails 18,20 secure the saddle 10 to the frame of an associated bicycle in a manner to be described below.

Figure 2:
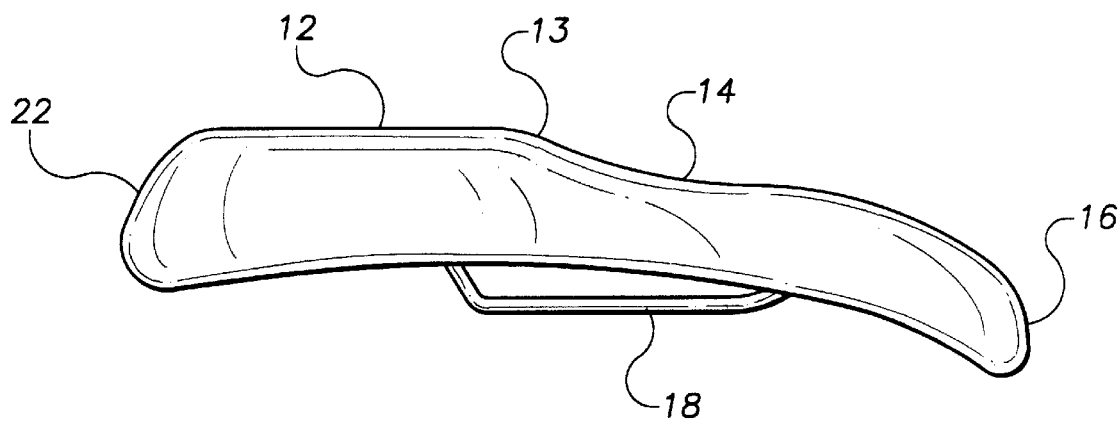
FIG. 2 is side elevation drawing of the saddle of FIG. 1.
Figure 3:
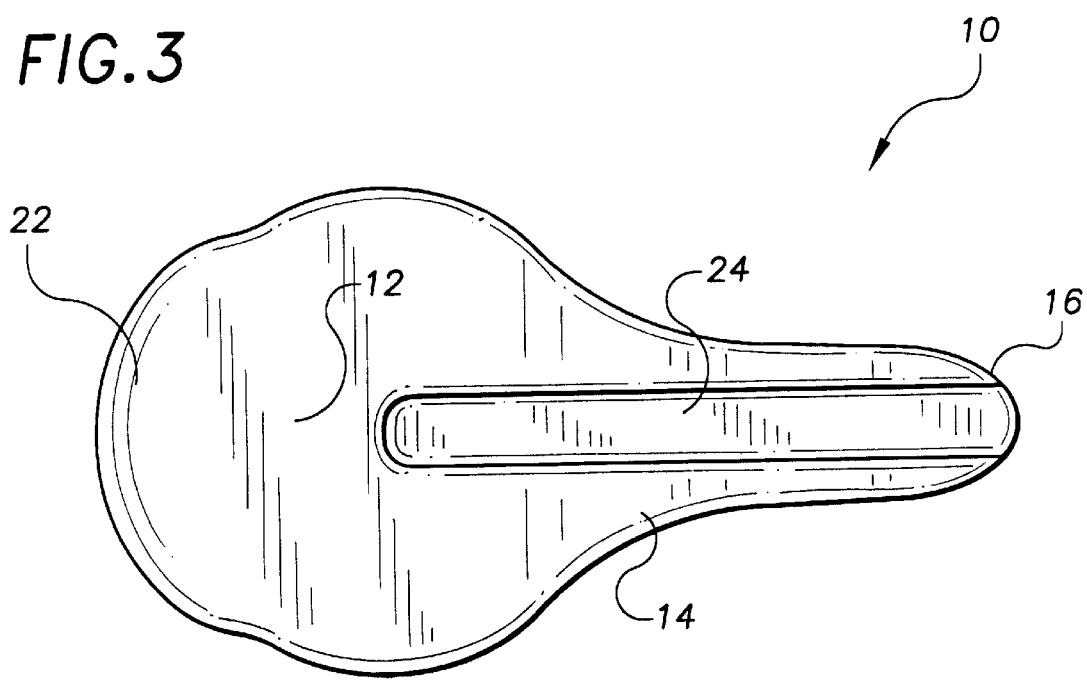
FIG. 3 is a top plan drawing of the saddle of FIG. 1.

The side view seen in FIG. 2 shows the saddle's 10 level platform 12, step 13, mid-section 14 and the nose 16. The tail of the saddle 10 is a downward ramp 22 beginning at the rear edge of the level platform 12, facilitating a descent position when the rider has a tendency to move backwards. A groove 24 (FIG. 3) extends from the mid-portion of the level platform 12 longitudinally along the length of the saddle 10 to the nose 16, to further ensure minimal soft tissue contact with the saddle 10. The groove 24 is formed by cutting a longitudinally extending segment from the foam layer covering the saddle's shell.

Figure 4:
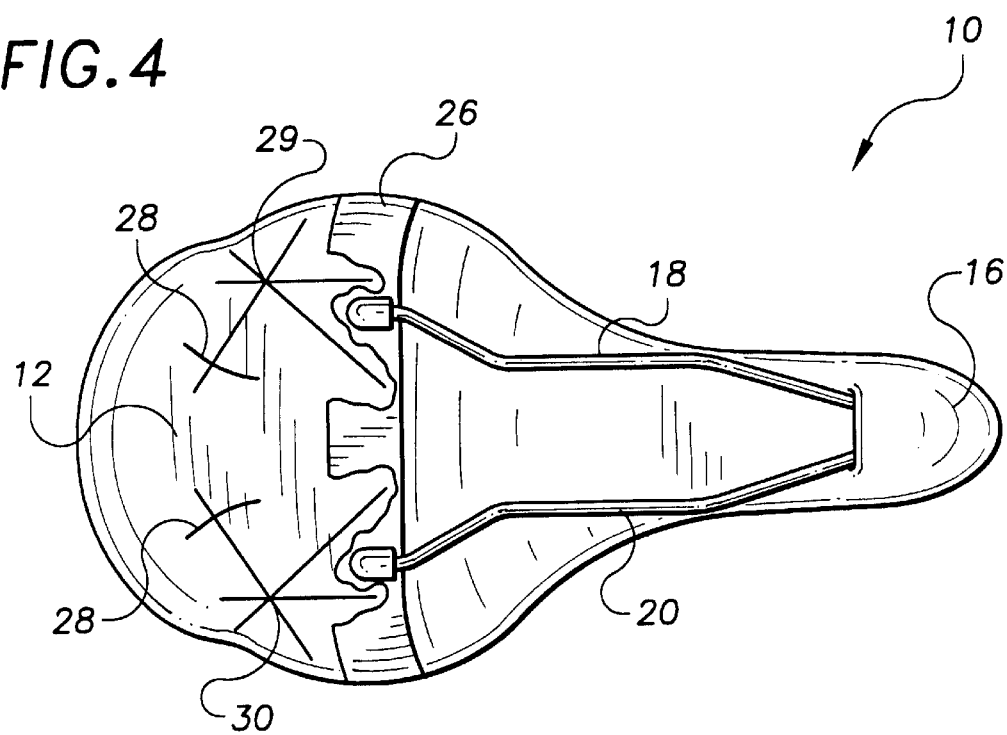
FIG. 4 is a bottom plan drawing of the saddle of FIG. 1 showing the underside of the saddle's shell.

Referring to FIG. 4, a bridge 26 is attached transversely to the underside of the saddle shell for use in securing the saddle 10 to its associated bicycle. It is to be noted that the bridge 26 is located under the forward portion of the level platform 12, allowing the rear portion of saddle 10 to flex downwards both for cyclist comfort and for better absorption of impact shock and vibration transferred up through the bicycle frame. Attached to the bridge 26 are the rear ends of the rails 18, 20 whose front ends are secured into the nose 16. The rails 18, 20 mate with a clamp connected to the frame of a bicycle 32, fastening the saddle 10 to the bicycle 32.

Additionally, the shell of the saddle 10 is perforated, i.e. 28, resulting in relieved and flexible sections 30,29 of the level platform 12 in the area where the ischial tuberosities contact the saddle 10. These flexing sections work in combination with the elevated level platform 12 to hold the rider correctly on the level platform 12 leaving soft tissue areas suspended above the saddle 10 surface.

The invention has been described in detail with particular reference to preferred embodiments thereof, but it will be understood that variations and modifications can be effected within the spirit and scope of the invention.

What is claimed is:

1. A bicycle saddle comprising a plastic shell covered by a pliant layer, said pliant layer having a leather-like surface covering, said shell having a top surface and a bottom surface, said bicycle saddle further comprising:
   a) a level support area having a front boundary transversely extending across the forward portion of said level support area, and a rear boundary transversely extending across the rear of said level support area,
   b) a downward step in said saddle at said front boundary,
   c) a midsection of said saddle sloping forwardly downward from said step,
   d) a nose section further sloping downward from said midsection, said nose being the front end of said saddle,
   e) a longitudinally oriented groove running substantially from half way between said front edge and said rear edge of said level support area to said nose section,
   f) first and second patterns of perforations through said shell, said patterns of perforations located at said level support area, whereby a rider's ischial tuberosities are centered over said patterns of perforations during use, and
   g) a bridge for mounting said saddle to an associated bicycle, said bridge secured transversely across said bottom of said shell, said bridge being located at said forward portion of said level support area, whereby the weight bearing portion of said level area aft of said bridge flexes under a rider's weight.

2. The bicycle saddle of claim 1 having a downward sloping ramp located at said rear boundary of said level support area.

3. The bicycle saddle of claim 1 having first and second rails anchored to said bridge and to said nose, whereby said saddle is mountable on a bicycle.

4. The bicycle saddle of claim 1 wherein said groove comprises a longitudinally extending void in said pliant layer.

5. A bicycle comprising a saddle, said saddle comprising: a plastic shell covered by a pliant layer, said pliant layer having a leather-like surface covering, said shell having a top surface and a bottom surface, said bicycle saddle further comprising:
   a) a level support area having a front boundary transversely extending across the forward portion of said level support area, and a rear boundary transversely extending across the rear of said level support area,
   b) a downward step in said saddle at said front boundary,
   c) a midsection of said saddle sloping forwardly downward from said step,
   d) a nose section further sloping downward from said midsection, said nose being the front end of said saddle,
   e) a longitudinally oriented groove running substantially from half way between said front edge and said rear edge of said level support area to said nose section,
   f) first and second patterns of perforations through said shell, said patterns of perforations located at said level support area, whereby a rider's ischial tuberosities are centered over said patterns of perforations during use, and
   g) a bridge for mounting said saddle to an associated bicycle, said bridge secured transversely across said bottom of said shell, said bridge being located at said forward portion of said level support area, whereby the weight bearing portion of said level area aft of said bridge flexes under a rider's weight.

6. In the bicycle of claim 5, the bicycle saddle having a downward sloping ramp located at said rear boundary of said level support area.

7. In the bicycle of claim 5, the bicycle saddle having first and second rails anchored to said bridge and to said nose, whereby said saddle is mountable on a bicycle.

8. In the bicycle of claim 5, the bicycle saddle wherein said groove comprises a longitudinally extending void in said pliant layer.

* * * * *